(12) United States Patent
Lohavanijaya

(10) Patent No.: US 6,224,088 B1
(45) Date of Patent: May 1, 2001

(54) INFLATABLE OCCUPANT PROTECTION DEVICE EXTENDING ADJACENT A WINDSHIELD

(75) Inventor: Dan Lohavanijaya, Chandler, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/306,117

(22) Filed: May 6, 1999

(51) Int. Cl.[7] .................................................. B60R 21/16
(52) U.S. Cl. ............................ 280/728.2; 280/728.1; 280/730.1
(58) Field of Search ........................... 280/728.1, 728.2, 280/730.1, 731, 732

(56) References Cited

U.S. PATENT DOCUMENTS

| | | | |
|---|---|---|---|
| 2,757,040 | * 7/1956 | McLelland | 280/749 |
| 2,806,737 | 9/1957 | Maxwell . | |
| 2,834,606 | 5/1958 | Bertrand . | |
| 3,414,292 | 12/1968 | Oldberg et al. . | |
| 3,894,750 | 7/1975 | Eckels . | |
| 3,984,126 | * 10/1976 | Goetz et al. | 280/740 |
| 4,130,298 | * 12/1978 | Shaunnessey | 280/730.1 |
| 5,112,081 | * 5/1992 | Kesseru | 280/749 |
| 5,232,244 | * 8/1993 | Itoh | 280/749 |
| 5,992,877 | * 11/1999 | Gray | 280/730.1 |
| 6,073,960 | * 6/2000 | Viano et al. | 280/730.1 |

FOREIGN PATENT DOCUMENTS 2191450 6/1986 (GB) .

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus (10) includes an inflatable vehicle occupant protection device (32). The vehicle occupant protection device (32) has a stored condition and an inflated condition in which the occupant protection device extends across an upper portion (20) of a vehicle windshield (14). The occupant protection device (32) has first and second end portions (38,40) located adjacent first and second A pillars (18,16) of the vehicle when in the inflated condition. An inflator (34) emits inflation fluid to inflate the occupant protection device (32) from the stored condition to the inflated condition. The inflator (34) is mounted in one of the first and second A pillars (18, 16) of the vehicle.

19 Claims, 3 Drawing Sheets

INFLATABLE OCCUPANT PROTECTION DEVICE EXTENDING ADJACENT A WINDSHIELD

FIELD OF THE INVENTION

The present invention relates to an inflatable vehicle occupant protection device, and particularly relates to an inflatable vehicle occupant protection device that extends across an upper portion of a vehicle windshield.

BACKGROUND OF THE INVENTION

An inflatable vehicle occupant protection device, such as an air bag, is inflated when a vehicle experiences a crash. Inflation fluid is directed to flow from an inflator into the air bag to inflate the air bag. When the air bag is inflated, it extends into the vehicle occupant compartment to help protect an occupant of the vehicle from a forceful impact with parts of the vehicle as a result of the crash.

The air bag and the inflator are mounted together in the vehicle, such as in a steering wheel or in an instrument panel or a dashboard. Furthermore, the air bag and the inflator may be mounted in a headliner of the vehicle.

SUMMARY OF THE INVENTION

In accordance with the present invention, an apparatus comprises an inflatable vehicle occupant protection device. The vehicle occupant protection device has a stored condition and an inflated condition. The vehicle occupant protection device extends across an upper portion of a vehicle windshield when in the inflated condition. The vehicle occupant protection device has first and second end portions located adjacent first and second A pillars of the vehicle when in the inflated condition.

An inflator emits inflation fluid to inflate the occupant protection device from the stored condition to the inflated condition. The inflator is mounted in one of the first and second A pillars of the vehicle.

BRIEF DESCRIPTION OF THE DRAWINGS

The foregoing and other features of the present invention will become apparent to one skilled in the art to which the present invention relates upon reading the following description of the invention with reference to the accompanying drawings wherein.

DESCRIPTION OF THE PREFERRED EMBODIMENT

Figure 1:
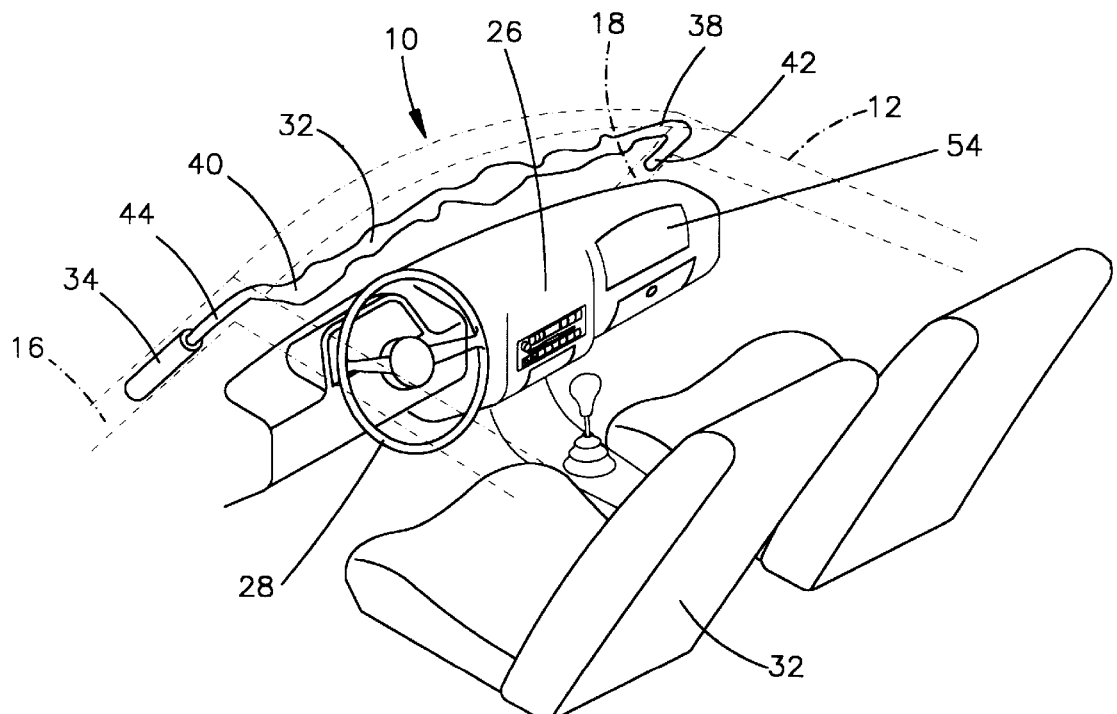
FIG. 1 is a schematic perspective view of a vehicle interior showing the present invention in a stored condition.
Figure 2:
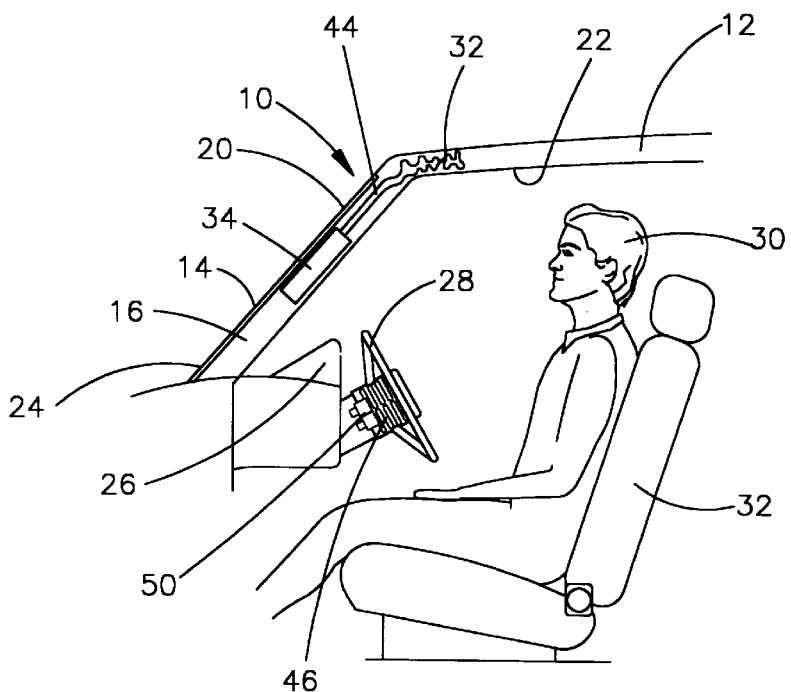
FIG. 2 is a schematic side view of the vehicle interior of FIG. 1.

An apparatus 10 comprising the present invention is shown in a stored condition in a vehicle 12 in FIGS. 1 and 2. The vehicle 12 has a windshield 14 (FIG. 2) extending between A pillars 16 and 18 of the vehicle. The windshield 14 has an upper portion 20 adjacent a headliner 22 and a lower portion 24 adjacent an instrument panel 26. A steering wheel 28 is located away from the instrument panel 26 toward an occupant 30 in a seat 32 of the vehicle.

The apparatus 10 (FIGS. 1 and 2) includes an inflatable occupant protection device, such as a tubular bladder 32, stored in the headliner 22 adjacent the upper portion 20 of the windshield 14. The bladder 32 has a stored condition, shown in FIGS. 1 and 2, and an inflated condition, shown in FIGS. 3 and 4. The bladder 32 has a cylindrical shape when in the inflated condition.

An inflator 34 (FIGS. 1 and 2) produces inflation fluid to inflate the bladder 32 from the stored condition to the inflated condition. The inflator 34 is mounted in the A pillar 16. The inflator 34 may be secured to the A pillar 16 in any manner known in the art.

The inflator 34 preferably contains a stored quantity of inflation fluid in the form of a gas to inflate the bladder 32. The inflator 34 alternatively could contain a combination of pressurized fluid and ignitable material for heating the inflation fluid, or could be a pyrotechnic inflator which uses the combustion of gas-generating material to generate inflation fluid.

Figure 3:
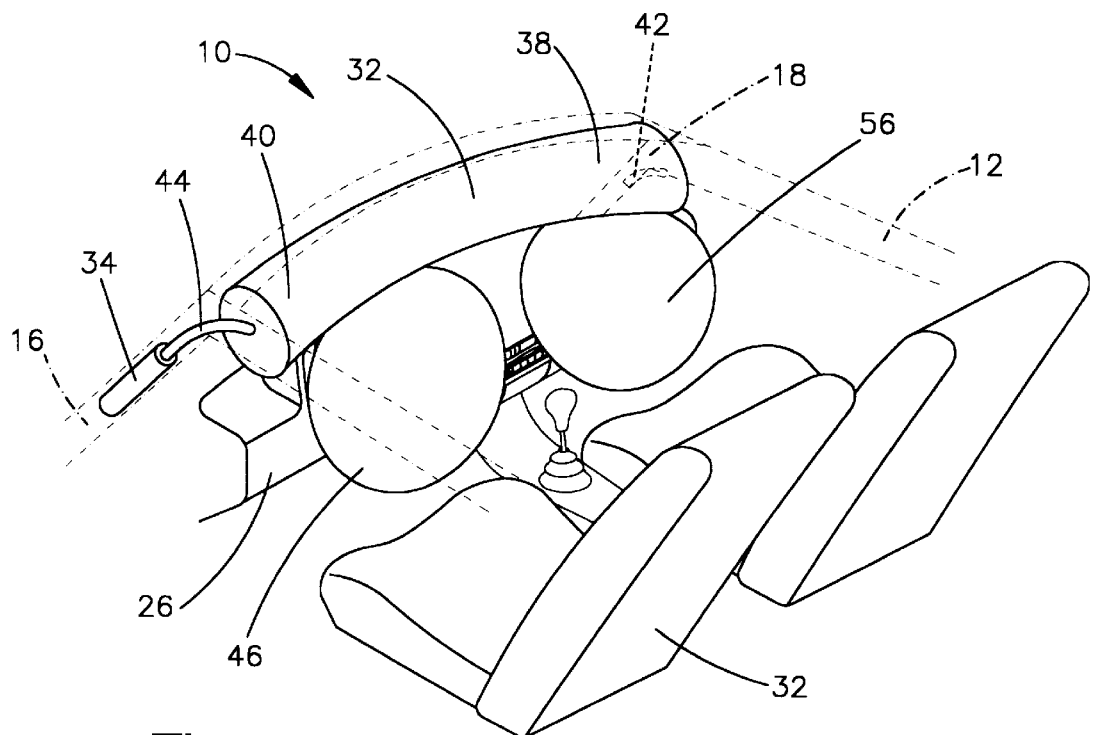
FIG. 3 is a schematic perspective view of the vehicle interior showing the present invention in an inflated condition.
Figure 4:
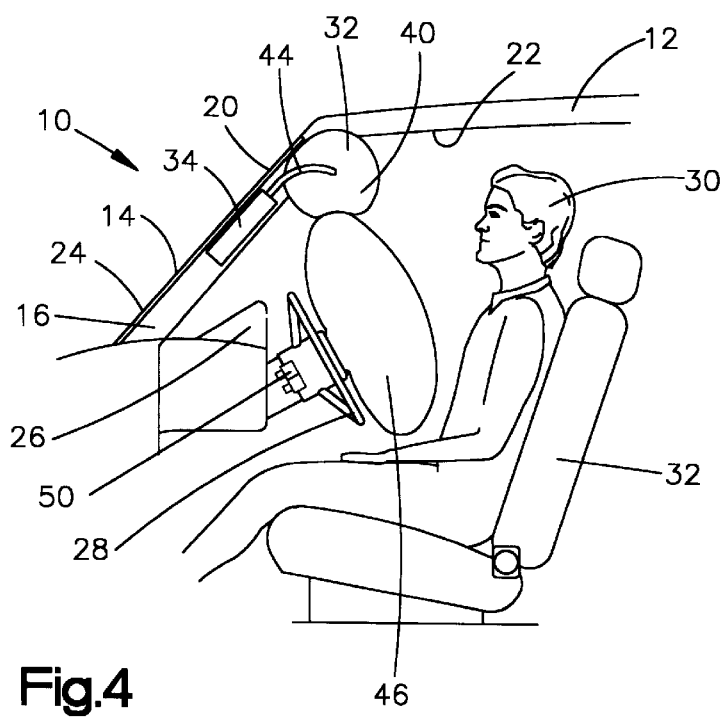
FIG. 4 is a schematic side view of the vehicle interior of FIG. 3.

The bladder 32 has end portions 38 and 40 located adjacent the A pillars 18 and 16 when the bladder 32 is in the stored condition (FIG. 1). The end portions 38 and 40 are also located adjacent the A pillars 18 and 16 when the bladder 32 is in the inflated condition (FIG. 3). The bladder 32 extends across the upper portion 20 of the windshield 14 between the A pillars 16 and 18 when in the inflated condition.

A tether 42 (FIGS. 1 and 3) extending from the end portion 38 connects the end portion 38 to the A pillar 18. The tether 42 is connected to the A pillar 18 in any manner known in the art, such as by bolting or otherwise securing an end of the tether to the A pillar. A tether 44 (FIGS. 1–4) extending from the end portion 40 connects the end portion 40 to the inflator 34 and to the A pillar 16. The tether 44 is a tubular member which conducts inflation fluid from the inflator 34 to the bladder 32. The tether 44 is fixedly connected to the inflator 34 and thus to the A pillar 16.

An inflatable vehicle occupant protection device, such as an air bag 46, is connected with the steering wheel 28 (FIG. 2). An inflator 50 connected with the steering wheel 28 produces inflation fluid to inflate the air bag 46 from a stored condition, shown in FIG. 2, to an inflated condition, shown in FIGS. 3 and 4, as is well known in the art. The air bag 46 extends adjacent the lower portion 24 of the windshield 14 when in the inflated condition.

A cover 54 (FIG. 1) covers an air bag 56 (FIG. 3) stored in the instrument panel 26, as is well known in the art. An inflator (not shown) produces inflation fluid to inflate the air bag 56 from a stored condition to an inflated condition. The air bag 56 extends adjacent the lower portion 24 of the windshield 14 when in the inflated condition.

Upon the occurrence of an accident requiring inflation of the bladder 32 and air bags 46, 56, the inflator 34 is actuated to release inflation fluid to inflate the bladder 32 from the stored condition to the inflated condition. The force of the inflating bladder 32 against the headliner 22 causes the headliner to break open. The headliner 22 may have a weakened area so that the headliner opens when a relatively low force is applied by the inflating bladder 32.

The bladder 32 inflates in a direction toward the upper portion 20 of the windshield 14 and away from the occupant 30 of the vehicle 12. The tethers 42 and 44 pull the bladder 32 toward the windshield 14 and away from the occupant 30 as the bladder inflates. When in the inflated condition, the bladder 32 extends across the upper portion 20 of the windshield 14 and between the A pillars 16 and 18. The bladder 32 helps protect the occupant 30 from an impact with the upper portion 20 of the windshield 14.

The inflator 50 is also actuated and inflates the air bag 46. The air bag 56 also inflates. When in their inflated conditions, the air bags 46 and 56 extend adjacent to the lower portion 24 of the windshield 14.

Figure 5:
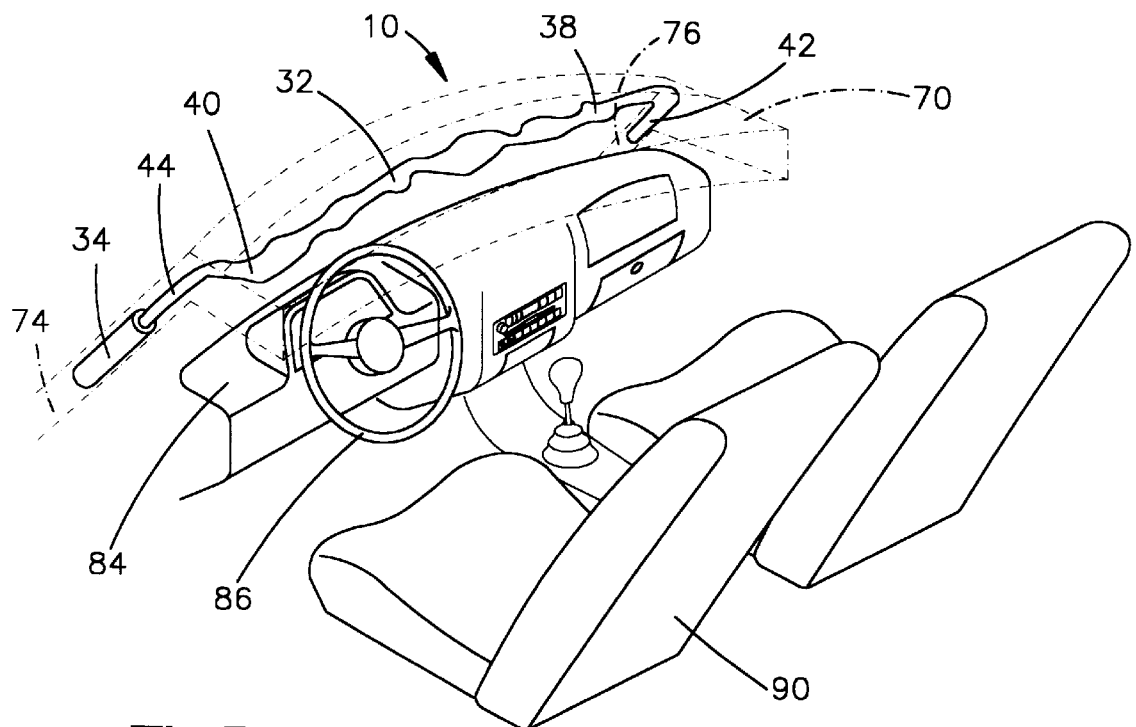
FIG. 5 is a schematic perspective view of an interior of a convertible vehicle showing the present invention in a stored condition.
Figure 6:
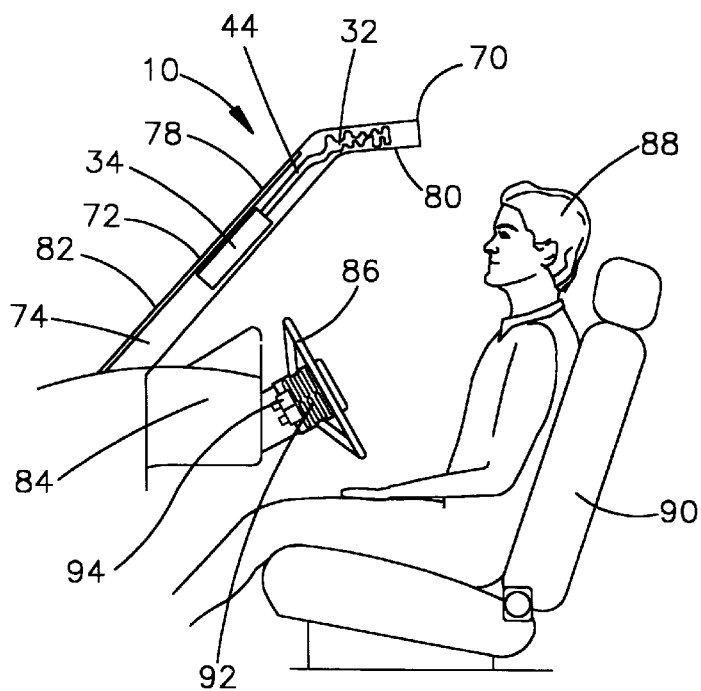
FIG. 6 is a schematic side view of the vehicle interior of FIG. 5.

The apparatus 10 is shown in a convertible vehicle 70 in FIGS. 5 and 6. The vehicle 70 has a windshield 72 (FIG. 6) extending between A pillars 74 and 76 of the vehicle. The windshield 72 has an upper portion 78 adjacent a headliner 80 and a lower portion 82 adjacent an instrument panel 84. A steering wheel 86 is located away from the instrument panel 84 toward an occupant 88 in a seat 90 of the vehicle.

The bladder 32 is stored in the headliner 80 or a storage compartment extending from the upper portion 78 of the windshield 72. The inflator 34 is mounted in the A pillar 74 and fixed connected to the A pillar 74. The tether 44 extending from the end portion 40 of the bladder 32 connects the bladder to the inflator 34 and thus to the A pillar 74. The tether 44 is a tubular member which directs inflation fluid into the bladder 32. The tether 42 connects the end portion 38 of the bladder 32 to the A pillar 76. The tether 42 is connected to the A pillar in any suitable manner.

An air bag 92 (FIG. 6) is connected with the steering wheel 86. An inflator 94 produces inflation fluid to inflate the air bag 92 from the stored condition, shown in FIG. 6, to an inflated condition, as is well known in the art. The air bag 92 extends adjacent the lower portion 82 of the windshield 72 when in the inflated condition. Another air bag and inflator may be stored in the instrument panel 84.

Upon the occurrence of an accident requiring inflation of the bladder 32 and air bag 92, the inflator 34 produces inflation fluid to inflate the bladder 32. The bladder 32 breaks open the headliner 80 upon inflation. The air bag 92 stored within the steering wheel 86 inflates upon actuation of the inflator 94. The bladder 32 extends across the upper portion 78 of the windshield 72 between the A pillars 74 and 76. The air bag 92 extends adjacent the lower portion 80 of the windshield 72.

From the above description of the invention, those skilled in the art will perceive improvements, changes and modifications. It is contemplated that a seat belt system would be used in conjunction with the bladder and the air bags. Such improvements, changes and modifications within the skill of the art are intended to be covered by the appended claims.

Having described the invention, the following is claimed:

1. Apparatus comprising:
   an inflatable vehicle occupant protection device having a stored condition and an inflated condition in which said vehicle occupant protection device extends across an upper portion of a vehicle windshield, said vehicle occupant protection device having first and second end portions located adjacent first and second A pillars of the vehicle when in the inflated condition; and
   an inflator for emitting inflation fluid to inflate said vehicle occupant protection device from the stored condition to the inflated condition, said inflator being mounted in one of the first and second A pillars of the vehicle.

2. Apparatus as defined in claim 1 wherein said vehicle occupant protection device is located in a headliner of the vehicle adjacent the upper portion of the windshield when in the stored condition.

3. Apparatus as defined in claim 1 wherein said vehicle occupant protection device expands in a direction toward the upper portion of the windshield and away from an occupant of the vehicle as said vehicle occupant protection device inflates from the stored condition to the inflated condition.

4. Apparatus as defined in claim 1 wherein said first and second end portions of said vehicle occupant protection device are located adjacent the first and second A pillars when said vehicle occupant protection device is in the stored condition.

5. Apparatus comprising:
   a first inflatable occupant protection device having a stored condition and an inflated condition in which said first occupant protection device extends adjacent an upper portion of a vehicle windshield;
   a second inflatable occupant protection device having a stored condition and an inflated condition in which said second inflatable occupant protection device extends adjacent a lower portion of the vehicle windshield;
   a first inflator for emitting inflation fluid to inflate said first occupant protection device from the stored condition to the inflated condition;
   a second inflator for emitting inflation fluid to inflate said second occupant protection device from the stored condition to the inflated condition.

6. Apparatus as defined in claim 5 wherein the vehicle has first and second A pillars and said first inflator is mounted in one of the first and second A pillars of the vehicle.

7. Apparatus as defined in claim 6 wherein said first occupant protection device has first and second end portions connected with first and second A pillars of the vehicle, said first occupant protection device extending across the upper portion of the windshield when in the inflated condition.

8. Apparatus as defined in claim 5 wherein said first occupant protection device is located in a headliner of the vehicle adjacent the upper portion of the windshield when in the stored condition.

9. Apparatus as defined in claim 5 wherein said second occupant protection device is located in a steering wheel when in the stored condition.

10. Apparatus comprising:
    an inflatable vehicle occupant protection device having a stored condition and an inflated condition in which said vehicle occupant protection device extends across an upper portion of a vehicle windshield, said vehicle occupant protection device having first and second end portions, only said first and second end portions of said vehicle occupant protection device being connected to the vehicle when in the inflated condition; and
    an inflator for emitting inflation fluid to inflate said vehicle occupant protection device from the stored condition to the inflated condition.

11. Apparatus as defined in claim 10 wherein said first and second end portions of said vehicle occupant protection device are connected to first and second A pillars of the vehicle.

12. Apparatus as defined in claim 11 wherein said inflator is mounted in one of the first and second A pillars.

13. Apparatus as defined in claim 10 wherein said occupant protection device is located in a headliner of the vehicle adjacent the upper portion of the windshield when in the stored condition.

14. Apparatus comprising:
    an inflatable vehicle occupant protection device having a stored condition and an inflated condition in which said vehicle occupant protection device extends across an upper portion of a vehicle windshield, said vehicle occupant protection device having first and second end portions located adjacent first and second A pillars of the vehicle when in the inflated condition; and an inflator for emitting inflation fluid to inflate said vehicle occupant protection device from the stored condition to the inflated condition, said inflator being mounted in one of the first and second A pillars of the vehicle, said vehicle occupant protection device including first and second tethers extending from said first and second A pillars to said first and second end portions to connect said vehicle occupant protection device to the vehicle.

15. Apparatus as defined in claim 14 wherein one of said first and second tethers is tubular and conducts inflation fluid from said inflator to said vehicle occupant protection device to inflate said vehicle occupant protection device.

16. Apparatus comprising:

a first inflatable occupant protection device having a stored condition and an inflated condition in which said first occupant protection device extends adjacent an upper portion of a vehicle windshield;

a second inflatable occupant protection device having a stored condition and an inflated condition in which said second inflatable occupant protection device extends adjacent a lower portion of the vehicle windshield;

a first inflator for emitting inflation fluid to inflate said first occupant protection device from the stored condition to the inflated condition;

a second inflator for emitting inflation fluid to inflate said second occupant protection device from the stored condition to the inflated condition, the vehicle having first and second A pillars and said first inflator being mounted in one of the first and second A pillars of the vehicle, said first occupant protection device extending across the upper portion of the windshield when in the inflated condition; and first and second tethers connecting said first and second end portions of the first occupant protection device to the first and second A pillars.

17. Apparatus as defined in claim 16 wherein one of said first and second tethers is tubular and conducts inflation fluid from said first inflator to said first occupant protection device.

18. Apparatus comprising:

an inflatable vehicle occupant protection device having a stored condition and an inflated condition in which said vehicle occupant protection device extends across an upper portion of a vehicle windshield, said vehicle occupant protection device having first and second end portions, only said first and second end portions of said vehicle occupant protection device being connected to the vehicle when in the inflated condition; and an inflator for emitting inflation fluid to inflate said vehicle occupant protection device from the stored condition to the inflated condition, said occupant protection device including first and second tethers extending from said first and second end portions to the vehicle to connect said occupant protection device to the vehicle.

19. Apparatus as defined in claim 18 wherein one of said first and second tethers conducts inflation fluid from said inflator to said vehicle occupant protection device to inflate said occupant protection device.

* * * * *